United States Patent [19]
Breant et al.

[11] Patent Number: 6,017,638
[45] Date of Patent: Jan. 25, 2000

[54] MULTILAYER MATERIAL COMPRISING A FILM CARRYING LAYER OF SILICON OXIDE AND A POLYOLEFIN FILM

[75] Inventors: Patrice Breant, Serquigny; Philippe Tordjeman, Billere, both of France

[73] Assignee: Elf Atochem S.A., Puteaux, France

[21] Appl. No.: 08/858,598

[22] Filed: May 19, 1997

[30] Foreign Application Priority Data

May 17, 1996 [FR] France .................................... 96 06166

[51] Int. Cl.⁷ ........................... B32B 27/30; B32B 27/32; B32B 27/36
[52] U.S. Cl. ........................ 428/448; 428/35.2; 428/35.7; 428/336; 428/451; 428/480; 428/520
[58] Field of Search ................................. 428/35.2, 35.7, 428/336, 448, 451, 480, 520

[56] References Cited

U.S. PATENT DOCUMENTS 5,731,092  3/1998  Breant et al. ........................... 428/448

FOREIGN PATENT DOCUMENTS

| 9528908 | 1/1996 | Australia . |
| 57-034118 | 2/1982 | Japan . |
| 5251590 | 9/1993 | Japan . |
| 5330568 | 12/1993 | Japan . |
| 7125150 | 5/1995 | Japan . |
| 1170319 | 11/1969 | United Kingdom . |

*Primary Examiner*—D. S. Nakarani

[57] ABSTRACT

A material is provided comprising a film carrying a layer of a silicon oxide, a film comprising a binder and a film comprising polyolefin, wherein said film comprising the binder further comprises a catalyst. The invention also relates to a package comprising this material and the use of a catalyst in a film comprising a binder arranged between a film carrying a silicon oxide layer and a polyolefin film, for improving adhesion.

44 Claims, No Drawings

MULTILAYER MATERIAL COMPRISING A FILM CARRYING LAYER OF SILICON OXIDE AND A POLYOLEFIN FILM

TABLE OF CONTENTS

|   | Page |
|---|---|
| 1. Background of the Invention | 1 |
| 2. Summary of the Invention | 2 |
| 3. Description of the Invention | 4 |
| 4. Description of the Preferred Embodiments | 8 |
| 5. Claims | 15 |
| 6. Abstract of the Disclosure | 22 |

BACKGROUND OF THE INVENTION

The present invention relates to a multilayer material, notably a packaging material, comprising a film carrying a layer of silicon oxide and a polyolefin film.

It more particularly relates to a multilayer material comprising a film carrying a layer of silicon oxide and a polyolefin film, an adhesion binder being interposed between the silicon oxide layer and the polyolefin film. Optionally, this material can be heat-bonded at the polyolefin film side onto cardboard after which, optionally, each side of the assembly obtained can be covered with a sheet of polyethylene.

These multilayer materials are useful for manufacturing packages in the form of so-called "brick packages" for food products in liquid form, e.g., for single servings of fruit juice.

JP-05330568 (Kokai) published on Dec. 14, 1993, discloses silica-covered polyester films onto which a sheet of adhesive-based ethylene resin is bonded, the latter being an ethylene/maleic anhydride/ethyl acrylate copolymer.

JP-07125150 (Kokai) published on May 16, 1995, discloses multilayer films comprising an intermediate EVA layer and an adjacent layer of an adhesive containing a compound which contains boron.

SUMMARY OF THE INVENTION

It has now been found possible to obtain non-delaminating multilayer materials, or multilayer materials which exhibit improved adhesion, which can be prepared at lower temperatures using binders comprising a reaction catalyst.

Thus, the invention provides a material comprising a multilayer film comprising: (1) a layer or film carrying a layer of silicon oxide, (2) a binder layer or film and (3) a layer or film of polyolefin, in which said binder film comprises a catalyst. The binder is interposed between the polyolefin film and the silicon oxide carrying film.

According to a first embodiment, the binder layer (2) comprises an ethylene/alkyl (meth)acrylate/termonomer terpolymer, said terpolymer being formed by terpolymization of ethylene and an alkyl (meth)acrylate with the termonomer or by grafting the termonomer onto an ethylene/alkyl (meth)acrylate copolymer. The termonomer is preferably glycidyl methacrylate. The preferred binder is an ethylene/alkyl (meth)acrylate/glycidyl methacrylate terpolymer, the glycidyl methacrylate termonomer being grafted or terpolymerized.

In a second embodiment, the binder layer (2) comprises an ethylene/unsaturated comonomer copolymer. The comonomer is preferably glycidyl methacrylate.

In another embodiment, the catalyst is selected from: $H_3BO_3$, 1,4-diaza-bicyclo [2,2,2] octane (hereafter "DABCO"), methyl-2-imidazole (hereafter "M2ID"), stearic acid, calcium stearate, $Na_2B_4O_7$ (hereafter "borax"), $NaH_2PO_4$, tris-nonylphenylphosphite (hereafter "TNPP"), tris-(2,4-methylphenyl) phosphite (hereafter "IRGAFOS®"), dibutyl-tin dilaurate (hereafter "DBTDL") and mixtures thereof. The preferred catalyst is $H_3BO_3$.

In one alternative embodiment, in the multilayer material according to the invention, the catalyst is present in a concentration from about 0.05% (about 500 ppm) to about 0.5% by weight (about 5,000 ppm) based on the binder weight.

In another alternative embodiment, in the multilayer material according to the invention, the catalyst is present in a concentration from about 10 ppm to about 500 ppm by weight based on the binder weight.

In a further embodiment, the film carrying the silicon oxide layer (1) on one surface further comprises a primer.

In another further embodiment, the film carrying the silicon oxide layer (1) on one surface has no primer.

In another embodiment, in the multilayer material according to the invention, the film material carrying the silicon oxide layer (1) comprises polyethylene terephthalate or polyethylene.

In a preferred embodiment, in the film according to the invention, the polyolefin film (3) comprises polyethylene or an ethylene copolymer.

The invention also provides a package comprising a multilayer material according to the invention.

Furthermore, the invention also includes the use of a catalyst in a film comprising a binder arranged between a film carrying a silicon oxide layer and a polyolefin film, for improving adhesion at a given manufacturing temperature. Alternatively, the invention also includes obtaining equivalent adhesion for a multilayer material comprising a catalyst in the binder layer at a reduced manufacturing temperature when compared to a multilayer material wherein the binder layer has no catalyst.

DESCRIPTION OF THE INVENTION

The invention will now be described in more detail below.

The invention provides several advantages. Firstly, at identical temperatures of implementation, the addition of a catalyst makes it possible to substantially increase adhesion and, in the majority of cases, to obtain non-delaminating structures. Secondly, the addition of a catalyst makes it possible to reduce the temperature of implementation while at the same time obtaining improved adhesion.

The film carrying the silicon oxide layer is known in the prior art. It is, for example, a polyester film such as polyethylene terephthalate (hereafter "PET") or polybutylene terephthalate (hereafter "PBT"); polyamide (hereafter "PA"); polyethylene (hereafter "PE"); or polypropylene (hereafter "PP"). Preferably, the film is a PET or a PE film. The film thickness can be between about 5 μm and about 200 μm. The silicon oxide layer, also referred to as SiOx, may be, for example, a single-molecule thick layer, i.e., a monolayer, or a layer up to a thickness of about 5,000 Angstroms. This layer can be deposited by plasma deposition, by evaporation or by any other suitable process.

The film carrying the silicon oxide layer can conventionally be arranged over an adhesion primer coat and wound onto reels of film. This film is then supplied arranged on a primary. For example, this primer can be any polyurethane primer known to those in the art.

When a primer is employed, it is preferably present on the film side uncoated with SiOx, i.e. on the PET side, for example.

The polyolefin film may be based on, but is not limited to, polyethylene or polypropylene. Alternatively, the polyolefin film may comprise an olefin copolymer, for example, an ethylene copolymer such as ethylene/propylene copolymer, ethylene/butylene copolymer, ethylene/hexene copolymer, or copolymers of ethylene with at least one monomer selected from (i) vinyl esters of saturated carboxylic acids such as vinyl acetate and (ii) esters or salts of unsaturated carboxylic acid such as alkyl (meth)acrylate. Polyolefin films comprising mixtures of polyolefins are also within the scope of the present invention. The thickness of the polyolefin film is conventional, for example, between about 10 μm and about 500 μm.

The binder layer according to the invention corresponds to what is conventionally understood by this term in the art. For example, binders include but are not limited to co-extrusion binders, thermoplastic binders and hot-melt bonding agents, among others.

As examples of this binder layer, the following can be mentioned: polyolefins modified with an unsaturated carboxylic acid derivative, the modification being by copolymerization, by terpolymerization or by grafting, and copolyolefins modified with an unsaturated carboxylic acid derivative, the modification being by terpolymerization or by grafting. For the binder, certain functionalized polyolefins can also be employed provided that the functional group content is sufficient to ensure adhesion between the layers. Example of such binders are given in the following patents, the contents of which are incorporated herein in their entirety: EP-A-210307; EP-A-33220; EP-266994; FR-A-2132780; EP-A-171777; and U.S. Pat. Nos.: 4,758,477; 4,762,890; 4,966,810; 4,452,942 and 3,658,948.

Examples of such binders are:

a copolymer of ethylene copolymerized with an alpha-olefin such as butene, hexene, octene, optionally grafted with maleic anhydride and/or optionally mixed with an ethylene-propylene copolymer, said ethylene/alpha-olefin copolymer containing, for example, from about 35% to about 80% by weight ethylene, the anhydride grafting rate being between about 0.01% and about 1% by weight, for example between about 0.05% and about 0.5%, based on the total weight of the polymer;

a copolymer of ethylene and vinyl acetate (hereafter "EVA"), optionally terpolymerized with maleic anhydride, containing more particularly up to about 40% by weight of vinyl acetate and, when present, about 0.1% to about 10% by weight maleic anhydride, based on the total copolymer weight;

EVA, optionally grafted with maleic anhydride, containing more particularly up to about 40% by weight of vinyl acetate and, when present, about 0.01% to about 1% by weight maleic anhydride, based on the total copolymer weight;

a copolymer of ethylene and an ethylenically-unsaturated monomer such as glycidyl methacrylate, more particularly containing up to about 40% by weight of the unsaturated monomer, based on the total copolymer weight, a polyolefin such as polyethylene, present in the form of linear low density PE, low density PE, very low density PE, etc., or polypropylene, the polyolefin being grafted with a carboxylic acid derivative such as maleic anhydride, the grafting rate being between about 0.01% and about 1% by weight, based on the total polymer weight;

a terpolymer of ethylene, alkyl (meth)acrylate (such as methyl, ethyl or t-butyl acrylate or (meth)acrylate) and maleic anhydride, containing up to about 40% by weight of alkyl (meth)acrylate and from about 0.01% to about 10% by weight of maleic anhydride, based on the total terpolymer weight, wherein the terpolymer is formed by terpolymerization with maleic anhydride or by grafting maleic anhydride onto an ethylene/alkyl (meth)acrylate copolymer; and a terpolymer of ethylene, alkyl (meth)acrylate (such as methyl, ethyl or t-butyl acrylate or (meth)acrylate) and glycidyl methacrylate, containing up to about 40% by weight of alkyl (meth)acrylate and from about 0.01% to about 10% by weight of glycidyl methacrylate, based on the total terpolymer weight, wherein the terpolymer is formed by terpolymerization with glycidyl methacrylate or by grafting glycidyl methacrylate onto an ethylene/alkyl (meth) acrylate copolymer.

Mixtures of binders are also suitable.

Terpolymers of ethylene/alkyl (meth)acrylate/termonomer, wherein the terpolymer is formed by terpolymerizing with the termonomer or by grafting the termonomer onto an ethylene/alkyl (meth)acrylate copolymer, are the preferred binders in the present invention. Said terpolymers comprising glycidyl methacrylate are the more preferred binders in this invention.

Binder film thickness is conventional, i.e., between about 5 μm and about 500 μm, for example, approximately 300 μm.

The term "catalyst" as used in the present invention stands for any compound able to speed up to the reaction at the SiOx-binder interface with the functional groups present on the binder, thus leading to improved adhesion at a given manufacturing temperature, or equivalent adhesion at a lower manufacturing temperature. Catalysts include but are not limited to: DABCO, $H_3BO_3$, M2ID, stearic acid, calcium stearate, borax, $NaH_2PO_4$, TNPP, Irgafos, DBTDL and mixtures thereof.

The catalyst is added in an amount sufficient to catalyze the reaction at the interface. Generally speaking, the catalyst is effective even at very low concentrations, for example, about 10 ppm by weight, based on the binder weight. The concentration able to be employed in the present invention can vary over a wide range, for example from about 10 ppm to about 500 ppm or from about 500 ppm to about 0.5% by weight (about 5,000 ppm), based on the binder weight.

The catalyst is added to the binder by any means known in the art such as, for example, by compounding, carried out at a suitable temperature, which is selected depending on the components to be mixed.

The films can comprise any additive conventionally employed in the art, such as anti-UV agents, anti-oxidants, fillers, processing additives, etc.

The multilayer materials according to the invention are prepared using techniques known to those skilled in the art. For example, they can be obtained by laminating a film carrying a silicon oxide layer with a twin-layer binder/polyolefin film. Alternatively, each film can be laminated or (co)extruded sequentially.

The multilayer materials according to the invention can be used as such or, optionally, can be associated with other materials such as, for example, films or sheets of polymer or cardboard, by methods such as heat sealing, bonding or coextrusion, for the manufacture of packages, notably packages for food products.

4. DESCRIPTION OF THE PREFERRED EMBODIMENTS

The following examples illustrate the invention without limiting it.

EXAMPLES

In these examples, polyester films comprising polyethylene terephthalate 12 μm thick and carrying, on one surface, an SiOx layer about 150 Angstroms thick were used, the latter layer having been deposited by plasma deposition. This PET film carrying the SiOx layer is referred to below simply as PET-SiOx. It was used either with an adhesion primer on the PET side or without a primer. The primer, when present, is a polyurethane primer.

Binder 1 used in Examples 1 to 4 is an ethylene/glycidyl methacrylate copolymer with a weight composition of 92/8, respectively, and having a melt flow index (hereafter "MFI") of 6 (at 190° C.).

Binder 2 used in Example 5 is an ethylene/butyl acrylate/glycidyl methacrylate terpolymer with a weight composition of 62/30/8, respectively, and having an MFI of 6 (at 190° C.).

The binder film is 300 μm thick.

The various catalysts used are commercially available catalysts. The catalysts were mixed with the binder using a compounding technique on a twin-screw extruder, the temperature of which was set at between 130° C. and 140° C. as a function of the components as is well known to those skilled in the mixing art. Initially, a master batch was prepared which was then incorporated into the remaining binder to obtain the final formulation.

When the binder was available in the film form, the PET-SiOx/binder structure was prepared by heat-bonding the PET-SiOx film to the binder film in a press at the temperature T, given in the following tables. When the binder was available in pellet form, the PET-SiOx/binder structure was prepared directly from the pellets, the PET-SiOx layer being brought into contact with the binder layer at the temperature T.

Adhesion, or rupture strength, between the PET-SiOx and the binder was measured by the peel-off strength at an angle of 180° C., at room temperature and at a rate of 100 mm/min using 25 mm wide samples. The average value calculated from 5 repetitions is reported here.

The influence of various catalysts on binder/PET-SiOx adhesion was studied by measuring adhesion for various catalysts under varying concentrations and at varying temperatures.

The temperature To is the minimum implementation, manufacturing or sample preparation temperature above which the binder develops adhesion; therefore, low values of To are desirable.

In the tables that follow, "without" signifies that there is no catalyst present in the binder and "N-DEL." indicates that the structure is non-delaminating. Adhesion values given in the tables are expressed in N/25 mm.

EXAMPLE 1

Binder 1, available in film form, was used, the PET-SiOx was used without a primer and the various catalysts were present in an amount of 1,000 ppm based on the binder weight. The results are given in Table 1.

These results show that the temperature at which adhesion starts is lower when a catalyst is used. Thus, considering $H_3BO_3$, the temperature To is decreased by at least 10° C. when compared to the To for the sample without catalyst. Moreover, for a given value of To, rupture strength is generally higher in the presence of a catalyst.

TABLE 1

| T, ° C. | Without Catalyst | Borax | $NaH_2PO_4$ | Stearic Acid | DBTDL | $H_3BO_3$ |
|---|---|---|---|---|---|---|
| 110 | 0 | 0 | 0 | 0 | 0 | 0.09 |
| 120 | 0.025 | 0.09 | 0.9 | 0.08 | 0.15 | 0.5 N-DEL |
| 130 | 1 N-DEL | 2.4 N-DEL | 1.5 | 1.6 | 1.1 N-DEL | N-DEL |
| 140 | N-DEL | N-DEL | 2.5 N-DEL | 2.1 N-DEL | N-DEL | N-DEL |
| 150 | N-DEL | N-DEL | N-DEL | N-DEL | N-DEL | N-DEL |
| 160 | N-DEL | N-DEL | N-DEL | N-DEL | N-DEL | N-DEL |

EXAMPLE 2

Binder 1, available in film form, was used, the PET-SiOx was used with an adhesion primer and the various catalysts were present in an amount of 1,000 ppm based on the binder weight. The results are given in Table 2.

These results show that the temperature at which adhesion starts is lower when a catalyst is employed. Thus, considering $H_3BO_3$, the temperature To decreases by at least 20° C. when compared to To for the sample without catalyst. Moreover, for a given value of To, rupture strength is generally higher in the presence of a catalyst.

TABLE 2

| T, ° C. | Without Catalyst | Borax | $NaH_2PO_4$ | Stearic Acid | DBTDL | $H_3BO_3$ |
|---|---|---|---|---|---|---|
| 105 | 0 | 0 | 0 | 0 | 0 | 1.5 N-DEL |
| 110 | 0 | 0 | 0 | 0 | 0 | 2 N-DEL |
| 120 | 0.025 | 0.1 | 0.5 | 0.5 | 0.15 | 0.5 N-DEL |
| 130 | 0.7 N-DEL | 1.1 N-DEL | 2 N-DEL | 1.6 N-DEL | 1.1 N-DEL | N-DEL |
| 140 | N-DEL | N-DEL | 2.5 N-DEL | 2.1 N-DEL | N-DEL | N-DEL |
| 150 | N-DEL | N-DEL | N-DEL | N-DEL | N-DEL | N-DEL |
| 160 | N-DEL | N-DEL | N-DEL | N-DEL | N-DEL | N-DEL |

EXAMPLE 3

Binder 1, available in pellet form, was used, the PET-SiOx was used without an adhesion primer and the influence of $H_3BO_3$ concentration was studied. The results are given in Table 3.

The results, for example, at 120° C., generally indicate that, adhesion is very distinctly improved by increasing the amount of the catalyst. Furthermore, at the same temperature and for catalyst amounts equal to or above 500 ppm, adhesion is so greatly improved that the layers become non-delaminating.

co-extruded and applied as a layer on a PET/SiOx film to form a three-layer film. The polyethylene side of the three-layer film was then applied to cardboard. From this multi-layer material, a "brick package" for liquids, notably food product liquids such as fruit juice, was prepared. The present invention thus provides multilayer materials advantageous for use, with a cardboard layer, in the manufacture of packaging for food products.

Obviously, the present invention is not limited to the embodiments described but may be subject to numerous variations readily available to those skilled in the art.

TABLE 3

| T, °C. | Without Catalyst | 25 ppm $H_3BO_3$ | 50 ppm $H_3BO_3$ | 100 ppm $H_3BO_3$ | 500 ppm $H_3BO_3$ | 1,000 ppm $H_3BO_3$ |
|---|---|---|---|---|---|---|
| 100 | 0 | 0 | 0 | 0 | 0 | 0 |
| 110 | 0 | 0 | 0 | 0 | 0.04 | 0.09 |
| 120 | 0.025 | 0.06 | 0.15 | 0.5 | 1.13 N-DEL | 0.5 N-DEL |
| 130 | 1 N-DEL | 2.6 N-DEL | 1.67 N-DEL | 1.5 N-DEL | N-DEL | N-DEL |
| 140 | N-DEL | 3 N-DEL | 2.6 N-DEL | 2.7 N-DEL | N-DEL | N-DEL |

EXAMPLE 4

Binder 1, available in pellet form, was used, the PET-SiOx was used with an adhesion primer and the influence of $H_3BO_3$ concentration was studied.

The results are given in Table 4 below and generally indicate that, starting from a concentration of 25 ppm, adhesion is very greatly improved by increasing the amount of catalyst.

TABLE 4

| T, °C. | Without Catalyst | 25 ppm $H_3BO_3$ | 50 ppm $H_3BO_3$ | 100 ppm $H_3BO_3$ | 500 ppm $H_3BO_3$ | 1,000 ppm $H_3BO_3$ |
|---|---|---|---|---|---|---|
| 100 | 0 | 0 | 0 | 0 | 0 | 0 |
| 110 | 0 | 0 | 0 | 0 | 1 N-DEL | 2 N-DEL |
| 120 | 0.025 | 0.05 | 0.025 | 0.04 | N-DEL | N-DEL |
| 130 | 0.7 N-DEL | 1 N-DEL | 1 N-DEL | 0.9 | N-DEL | N-DEL |
| 140 | N-DEL | N-DEL | N-DEL | 1.5 N-DEL | N-DEL | N-DEL |

EXAMPLE 5

In this example, binder 1 of the preceding Examples was replaced by binder 2, the characteristics of which are given above, the remaining conditions being identical. $H_3BO_3$, at a concentration of 1,000 ppm by weight based on the binder weight, was added to binder 2. The PET-SiOx/binder structure was used both with and without adhesion primer. The results are given in Table 5; in this Table, and means that the adhesion was not determined.

Moreover, the results obtained were compared with the binder of the preceding examples, in which the $H_3BO_3$ catalyst concentration was 1,000 ppm (Examples 1 and 2, respectively,). These results clearly show that adhesion is excellent, for a very low temperature of implementation. The results also show that excellent results are obtained with binder 2 of Example 5 when compared with the results of the preceding Examples.

TABLE 5

| | Without Primer | | With Primer | |
|---|---|---|---|---|
| T, °C. | Binder 1 | Binder 2 | Binder 1 | Binder 2 |
| 90 | nd | N-DEL | nd | N-DEL |
| 105 | nd | nd | 1.5 N-DEL | nd |
| 110 | 0.09 | N-DEL | 2 N-DEL | N-DEL |
| 120 | 0.5 N-DEL | nd | 0.5 N-DEL | nd |
| 130 | N-DEL | N-DEL | N-DEL | N-DEL |
| 140 | N-DEL | nd | N-DEL | nd |
| 150 | N-DEL | N-DEL | N-DEL | N-DEL |

EXAMPLE 6

The above structures were used in preparing multilayer materials. For this, a polyethylene/binder film was

What is claimed is:

1. A material comprising a film carrying a layer of silicon oxide, a binder layer comprising a polymeric binder and a catalyst, and a film comprising a polyolefin, in which said binder layer bonds the polyolefin film to the layer of silicon oxide.

2. The material according to claim 1, wherein said binder comprises an ethylene/alkyl (meth)acrylate/termonomer terpolymer, said terpolymer being formed by terpolymerizing ethylene, alkyl (meth)acrylate and the termonomer or by grafting the termonomer onto an ethylene/alkyl (meth) acrylate copolymer.

3. The material according to claim 2, wherein the termonomer comprises glycidyl methacrylate.

4. The material according to claim 2, wherein said catalyst is selected from the group consisting of $H_3BO_3$, 1,4-diazabicyclo [2,2,2] octane, methyl-2-imidazole, stearic acid, calcium stearate, $Na_2B_4O_7$, $NaH_2PO_4$, tris-nonylphenylphosphite, tris-(2,4-methylphenyl) phosphite, dibutyl-tin di-laurate and mixtures thereof.

5. The material according to claim 4, wherein said catalyst is $H_3BO_3$.

6. The material according to claim 4, wherein said catalyst is present at a concentration of from 500 ppm to about 0.5% by weight based on the binder weight.

7. The material according to claim 4, wherein said catalyst is present at a concentration of from about 10 ppm to 500 ppm by weight based on the binder weight.

8. The material according to claim 2, wherein said catalyst is present at a concentration of from 500 ppm to about 0.5% by weight based on the binder weight.

9. The material according to claim 8, wherein the film carrying the silicon oxide layer comprises polyethylene terephthalate or polyethylene.

10. The material according to claim 8, wherein said polyolefin film comprises polyethylene or a copolymer comprising ethylene.

11. The material according to claim 2, wherein said catalyst is present at a concentration of from about 10 ppm to 500 ppm by weight based on the binder weight.

12. The material according to claim 2, wherein the film carrying the silicon oxide layer comprises polyethylene terephthalate or polyethylene.

13. The material according to claim 2, wherein said polyolefin film comprises polyethylene or a copolymer comprising ethylene.

14. The material according to claim 2, wherein said film carrying the silicon oxide layer further comprises a primer.

15. The material according to claim 1, wherein said binder comprises an ethylene/glycidyl methacrylate copolymer.

16. The material according to claim 15, wherein said catalyst is selected from the group consisting of $H_3BO_3$, 1,4-diaza-bicyclo [2,2,2] octane, methyl-2-imidazole, stearic acid, calcium stearate, $Na_2B_4O_7$, $NaH_2PO_4$, tris-nonylphenylphosphite, tris-(2,4-methylphenyl) phosphite, dibutyl-tin di-laurate and mixtures thereof.

17. The material according to claim 16, wherein said catalyst is $H_3BO_3$.

18. The material according to claim 16, wherein said catalyst is present at a concentration of from 500 ppm to about 0.5% by weight based on the binder weight.

19. The material according to claim 16, wherein said catalyst is present at a concentration of from about 10 ppm to 500 ppm by weight based on the binder weight.

20. The material according to claim 15, wherein said catalyst is present at a concentration of from 500 ppm to about 0.5% by weight based on the binder weight.

21. The material according to claim 20, wherein the film carrying the silicon oxide layer is polyethylene terephthalate or polyethylene.

22. The material according to claim 20, wherein said polyolefin film comprises polyethylene or a copolymer comprising ethylene.

23. The material according to claim 15, wherein said catalyst is present at a concentration of from about 10 ppm to 500 ppm by weight based on the binder weight.

24. The material according to claim 15, wherein the film carrying the silicon oxide layer comprises polyethylene terephthalate or polyethylene.

25. The material according to claim 15, wherein said polyolefin film comprises polyethylene or a copolymer comprising ethylene.

26. The material according to claim 15, wherein said film carrying the silicon oxide layer further comprises a primer.

27. A material comprising a film carrying a layer of a silicon oxide, a binder layer comprising a polymeric binder and a catalyst, and a film comprising a polyolefin, wherein the film carrying the silicon oxide layer comprises polyethylene terephthalate or polyethylene, wherein said polymeric binder comprises an ethylene/alkyl (meth)acrylate/termonomer terpolymer, said termonomer being grafted or terpolymerized, wherein said catalyst is present at a concentration of from 500 ppm to about 0.5% by weight based on the polymeric binder weight, and wherein said polyolefin film comprises polyethylene or a copolymer comprising ethylene, and further wherein said binder layer bonds the polyolefin film to the layer of silicon oxide.

28. The material according to claim 27, wherein the termonomer comprises glycidyl methacrylate.

29. The material according to claim 27, wherein said catalyst is selected from the group consisting of $H_3BO_3$, 1,4-diaza-bicyclo [2,2,2] octane, methyl-2-imidazole, stearic acid, calcium stearate, $Na_2B_4O_7$, $NaH_2PO_4$, tris-nonylphenylphosphite, tris-(2,4-methylphenyl) phosphite, dibutyl-tin dilaurate and mixtures thereof.

30. The material according to claim 29, wherein said catalyst is $H_3BO_3$.

31. A package comprising the material according to claim 27.

32. A material comprising a film carrying a layer of a silicon oxide, a binder layer comprising a polymeric binder and a catalyst, and a film comprising a polyolefin, wherein the film carrying the silicon oxide layer comprises polyethylene terephthalate or polyethylene, wherein said polymeric binder comprises an ethylene/alkyl (meth)acrylate/termonomer terpolymer, said termonomer being grafted or terpolymerized, wherein said catalyst is present at a concentration of from about 10 ppm to 500 ppm by weight based on the polymeric binder weight, and wherein said polyolefin film comprises polyethylene or a copolymer comprising ethylene, and further wherein said binder layer bonds the polyolefin film to the layer of silicon oxide.

33. The material according to claim 32, wherein said termonomer comprises glycidyl methacrylate.

34. The material according to claim 32, wherein said catalyst is selected from the group consisting of $H_3BO_3$, 1,4-diaza-bicyclo [2,2,2] octane, methyl-2-imidazole, stearic acid, calcium stearate, $Na_2B_4O_7$, $NaH_2PO_4$, tris-nonylphenylphosphite, tris-(2,4-methylphenyl) phosphite, dibutyl-tin dilaurate and mixtures thereof.

35. The material according to claim 34, wherein said catalyst is $H_3BO_3$.

36. A package comprising the material according to claim 32.

37. A material comprising a film carrying a layer of a silicon oxide, a binder layer comprising a polymeric binder and a catalyst, and a film comprising a polyolefin, wherein the film carrying the silicon oxide layer comprises polyethylene terephthalate or polyethylene, wherein said polymeric binder comprises an ethylene/glycidyl methacrylate copolymer, wherein said catalyst is present at a concentration of from 500 ppm to about 0.5% by weight based on the polymeric binder weight, and wherein said polyolefin film comprises polyethylene or a copolymer comprising ethylene, and further wherein said binder layer bonds the polyolefin film to the layer of silicon oxide.

38. The material according to claim 37, wherein said catalyst is selected from the group consisting of $H_3BO_3$, 1,4-diaza-bicyclo [2,2,2] octane, methyl-2-imidazole, stearic acid, calcium stearate, $Na_2B_4O_7$, $NaH_2PO_4$, tris-nonylphenylphosphite, tris-(2,4-methylphenyl) phosphite, dibutyl-tin dilaurate and mixtures thereof.

39. The material according to claim 38, wherein said catalyst is $H_3BO_3$.

40. A package comprising the material according to claim 37.

41. A material comprising a film carrying a layer of a silicon oxide, a binder layer comprising a polymeric binder and a catalyst, and a film comprising a polyolefin, wherein the film carrying the silicon oxide layer comprises polyethylene terephthalate or polyethylene, wherein said polymeric binder comprises an ethylene/glycidyl methacrylate copolymer, wherein said catalyst is present at a concentration of from about 10 ppm to 500 ppm by weight based on the polymeric binder weight, and wherein said polyolefin film comprises polyethylene or a copolymer comprising ethylene, and further wherein said binder layer bonds the polyolefin film to the layer of silicon oxide.

42. The material according to claim 41, wherein said catalyst is selected from the group consisting of $H_3BO_3$, 1,4-diaza-bicyclo [2,2,2] octane, methyl-2-imidazole, stearic acid, calcium stearate, $Na_2B_4O_7$, $NaH_2PO_4$, tris-nonylphenylphosphite, tris-(2,4-methylphenyl) phosphite, dibutyl-tin dilaurate and mixtures thereof.

43. The material according to claim 42, wherein said catalyst is $H_3BO_3$.

44. A package comprising the material according to claim 4.

* * * * *